(12) United States Patent
Sanchez Vega et al.

(10) Patent No.: US 12,256,447 B2
(45) Date of Patent: Mar. 18, 2025

(54) MULTIPATH CONFIGURATION AND CONTROL FOR A WIRELESS COMMUNICATIONS NETWORK

(71) Applicant: Telefonaktiebolaget LM Ericsson (publ), Stockholm (SE)

(72) Inventors: Veronica Sanchez Vega, Madrid (ES); Miguel Angel Muñoz de la Torre Alonso, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/768,682

(22) PCT Filed: Jan. 7, 2020

(86) PCT No.: PCT/EP2020/050210
§ 371 (c)(1),
(2) Date: Apr. 13, 2022

(87) PCT Pub. No.: WO2021/093998
PCT Pub. Date: May 20, 2021

(65) Prior Publication Data
US 2024/0121842 A1    Apr. 11, 2024

(30) Foreign Application Priority Data
Nov. 15, 2019    (EP) .................................... 19383011

(51) Int. Cl.
*H04W 76/15*    (2018.01)
*H04L 45/24*    (2022.01)
(Continued)

(52) U.S. Cl.
CPC ............. *H04W 76/15* (2018.02); *H04L 45/24* (2013.01); *H04L 69/14* (2013.01); *H04L 69/16* (2013.01);
(Continued)

(58) Field of Classification Search
CPC ..... H04W 76/15; H04W 76/16; H04W 80/06; H04W 88/06; H04L 45/24; H04L 69/14; H04L 69/16
See application file for complete search history.

(56) References Cited

U.S. PATENT DOCUMENTS 10,405,365 B2 *    9/2019  Han ....................... H04L 47/122
10,979,355 B2 *    4/2021  Kiss ...................... H04W 80/06
11,930,547 B2 *    3/2024  Szilagyi .................. H04L 69/14

FOREIGN PATENT DOCUMENTS

WO    2012142437 A1    10/2012
WO    2019032972 A1    2/2019

OTHER PUBLICATIONS

3rd Generation Partnership Project, "3rd Generation Partnership Project; Technical Specification Group Services and System Aspects; Study on access traffic steering, switch and splitting support in the 5G system architecture (Release 16)", Technical Report, 3GPP TR 23.793 V16.0.0, Dec. 1, 2018, pp. 1-114, 3GPP.
(Continued)

*Primary Examiner* — Chandrahas B Patel
(74) *Attorney, Agent, or Firm* — Weisberg I.P. Law, P.A.

(57) ABSTRACT

A method for operating a policy control entity in a wireless communications network. In the wireless communications network a multipath transmission with at least two data packet sessions can be provided between a content provider and a user equipment. The method comprises the following steps. First, an establishment request is received from a network exposure entity to set up the multipath transmission. The establishment request comprises multipath information including a multipath indicator, indicating that the multipath transmission is requested, and a flow description for the first data packet session and the second data packet session. Then, for at least the first data packet session and the second data packet session, a multipath transmission policy
(Continued)

is determined. Then, in response to the establishment request, a response message is transmitted to the network exposure entity, including the multipath transmission policy.

16 Claims, 9 Drawing Sheets

(51) Int. Cl.
*H04L 69/14* (2022.01)
*H04L 69/16* (2022.01)
*H04W 76/16* (2018.01)
*H04W 80/06* (2009.01)
*H04W 88/06* (2009.01)

(52) U.S. Cl.
CPC ........... *H04W 76/16* (2018.02); *H04W 80/06* (2013.01); *H04W 88/06* (2013.01)

(56) References Cited

OTHER PUBLICATIONS

3rd Generation Partnership Project, "3rd Generation Partnership Project; Technical Specification Group Services and System Aspects; System Architecture for the 5G System (5GS); Stage 2 (Release 16)", Technical Specification, 3GPP TS 23.501 V16.2.0, Sep. 1, 2019, pp. 1-391, 3GPP.

\* cited by examiner

MULTIPATH CONFIGURATION AND CONTROL FOR A WIRELESS COMMUNICATIONS NETWORK

TECHNICAL FIELD

The present invention relates to methods for controlling data traffic in a wireless communications network and to corresponding devices, network nodes, systems, and computer programs.

BACKGROUND

FIG. 1 shows a 5G NR architecture with service based interfaces. The 5G core network part comprises a Network Slice Selection Function, NSSF 10, a Network Exposure Function 15, a Network Repository Function, NRF, 20, a Policy Control Function, PCF, 25, a Unified Data Management, UDM, 30, an Application Function, AF, 35, an Authentication Server Function, AUSF, 40, an Access and Mobility Management Function, AMF, 45, and a Session Management Function, SMF, 50. A User Equipment, UE, 60, is connected to the Radio Access Network, RAN, 70, wherein a User Plane Function, UPF, 80 is provided to connect the UE 60 to a data network, DN, 90.

Having service based interfaces in the 5G Core Control Plane (CP) implies that the Network Functions, NFs, in the 5G Core CP provide services that are consumed by other NFs in the 5G Core CP.

The roles of these entities and the interfaces have been defined in the 3GPP TS 23.501 and the procedures have been described in TS 23.502.

The most relevant 5G System Architecture network functions for this invention are the following:

- AF, 35, interacts with the 3GPP Core Network so as to provide information that will allow network operator to manage application's traffic in a certain way;
- NEF 15 is the entry point for ASPs (Application Service Providers) to the Mobile Network Operator Network a.k.a. Connectivity Service Provider (CSP). NEF 15 exposes the Connectivity Service Provider Mobile Network capabilities to the ASPs and translates between information as known by the external Application Functions (AFs) and information as known by the Mobile Network Function/s.
- PCF, 25, supports unified policy framework to govern the network behaviour. In particular, PCF 25 provides Policy and Charging Control, PCC, rules to the Policy and Charging Enforcement Function, PCEF, that is, SMF 50/UPF 80 that enforces policy and charging decisions according to provisioned PCC rules;
- SMF 50 is responsible for Session establishment, modification and release, including selection and control of the UPF 80 entities. SMF 50 interacts with the UPF 80 over N4 Reference point using PFCP (Packet Flow Central Protocol) procedures. Moreover, SMF 50 receives PCC rules from PCF 25 and configures the UPF 80 accordingly;
- UPF, 80, supports handling of user plane traffic based on the rules received from SMF, in particular packet inspection and different enforcement actions (QoS, Charging, etc.)
- BSF (Binding Support Function, not shown in FIG. 1) is used to find the PCF in charge of the user PDU connection policy session in scenarios with more than one PCF.

In the Packet Core of the 4G System Architecture:

- PCRF (Policy and Charging Rules Function) plays the role of the PCF above;
- PGW-C(Control plane of the Packet Data Network Gateway) and/or TDF-C(Control plane of the Traffic Detection Function) plays the role of the SMF above;
- PGW PGW-U (User plane of the Packet Data Network Gateway) and/or TDF-U (User plane of the Traffic Detection Function) plays the role of the UPF above;
- SCEF (Service Capability Exposure Function) plays the role of NEF above, at least for the APIs (Application Programming Interfaces) listed above which are supported also in 4G;
- SCS/AF (Service Capability Server/Application Function) plays the role of AF above.

In the following, Mobile Core will refer to any, the 5G Core or the Packet Core of the 4G System Architecture. Furthermore, CP will refer to any SMF or PGW-C, and UP to any, UPF or PGW-U.

Current wireless communications networks support multiple connectivity to different access types, which can be 3GPP ($3^{rd}$ Generation Partnership Project) related, such as LTE (Long Term Evolution) or 5G (New Radio), or non-3GPP related, such as WiFi. That is, current wireless communications networks can connect to a user equipment through one or more access nodes, the access nodes comprising a cellular access node, or 3GPP access node, such as a LTE or 5G NR access node, and a non-cellular access node, or non-3GPP access node, such as a WiFi access node.

This configuration allows nodes to transmit data over the wireless communications network across the one or more cellular and non-cellular access nodes. A node such as a user terminal, or a content provider, thus has the option to transmit data over one or more access type, cellular and non-cellular.

Each access type may provide distinct QoS (Quality of Service) and capacity characteristics to the data transmission, which may vary for a given location and/or over time. Moreover, each access type may imply a distinct charging tariffs for the subscriber, for instance free WiFi and limited volume quota for 3GPP data, as well as involve different costs for the network operator, resulting for instance from leased WLAN access, cost of infrastructure for cellular networks, etc. Additionally, each access type may result in different battery use for the user terminal. The decision concerning which access type to use is therefore complex and depending on several parameters. With the growth of Internet traffic and new service demanding improved QoE (Quality of Experience), content providers and network operators are deploying their own solutions to control the data flow across cellular and non-cellular access. In general, content providers are interested on maximizing the QoE and reliability, without incurring in extra subscriber cost. Network operators are generally interested on optimizing their network resources and lower their network cost and as well on improving overall subscriber QoE, and potentially monetize it.

A common approach for allowing an efficient use of the wireless communications network involves making a combined use of the cellular and of the non-cellular accesses. This is generally referred to as multipath transmission.

Various multipath transmission solutions are defined in the industry and IETF (Internet Engineering Task Force) standards, ranging from link to application level techniques. Transport multipath protocols such as MP-TCP (Multi Path Transmission Control Protocol), QUIC connection migration, or future MP-QUIC (Multi Path QUIC), are known for establishing multipath communication. Additionally, recent 3GPP developments have introduced a solution known as ATSSS (Access Traffic Steering Switching Splitting).

In general, the end to end flow control and congestion control of the known techniques allows to switch and split data flows in a QoE friendly manner, as well as in a seamless manner to the application and underlying network. This provides a disadvantage for the network operator, who is not aware of, and cannot influence, the multipath connection. This may also result in a reduces QoS for the user, as the network operator may provide advantageous information, such as congestion information, for the managing of the multipath communication.

Moreover, MP-TCP depends on the operating system of the user terminal. In particular, the operating system must support a MP-TCP client proxy and expose an API (Application Programming Interface) to the application for selecting the preferred multipath policy. Data packet steering decision will be based on such policy and battery criteria. If the operating system of the user terminal does not support MP-TCP it will not be possible for the application to make use of a multipath transmission.

Additionally, ATSSS allows simultaneous connectivity of a PDU (Protocol Data Unit) session across 3GPP and non 3GPP access by means of Multi-Access PDU (MA-PDU) session. ATSSS introduces the MP-TCP proxy as an anchor User Plane Function (UPF) function and proposes other methods for steering QUIC traffic such as IP flow switching or such as QUIC tunnelling across device and User Plane Function path.

Both multipath transmissions and 3GPP ATSSS solutions are designed to be independent and work in a non-collaborative way. ATSSS is an optional feature so in case of native multipath transmission it is up to device to set a Multiaccess PDU session or two independent PDU sessions towards same packet Data Network (PDN) to provide multiple interface connectivity. Even if ATSSS is supported, it is very likely that a device sets two different PDU sessions to carry multipath traffic, one PDU session for each access type and Multipath subflow 5-tuple. This allows content providers to secure the enforcement of their policies, without any network operator interference. The selection of two independent PDU sessions poses significant problems to the network operator. In particular, the network operator is not aware of the multipath traffic, which is interpreted as two separate IP sessions. Each session could also end in different anchor User Plane Functions making it complex to enforce existing service detection and existing service-based policies. In case of non-service charging, the charging system will not know the correlation across the various PDU sessions, so as to conciliate them in a single Charging Data Record (CDR). Moreover, it is not possible to apply different charging policies per access type. Additionally, the network operator cannot influence steering decision thereby potentially incurring in unwanted network cost or inefficient resource management. The selection of two independent PDU sessions further limits as well the content provider. In particular, the content provider does not consider the network operator preferred policy on which access network to use and the actual network conditions, such as congestion. The selection of two independent PDU sessions may also be disadvantageous for the user, as the network operator cannot apply differentiating charging models which can be beneficial for the user.

On the network operator side, it is common to rely on 3GPP multi-access solutions. In EPC (Evolved Packet Core) and 5GC (5G Core) Rel15, these focus on providing seamless IP session mobility across 3GPP and WiFi accesses to the application, such as IMS (IP Multimedia Subsystem) voice mobility between 3GPP and WiFi by means of WLAN interworking solution with Packet Core. Some network operators also want to control the WiFi offload of data services. Since steering decision is local to the user terminal, 3GPP has defined along time various solutions to distribute network operator policies to the user equipment, such as ANDSF (Access Network Discovery and Selection Function) or NBIFOM (Network based IP session mobility). Such solutions have not generally been adopted by terminals.

SUMMARY

Accordingly, there is a need for techniques which allow for efficiently configuring of a multipath transmission between a user terminal and a content provider.

This need is met by the features of the independent claims. Further aspects are described in the dependent claims.

According to one aspect, a method for operating a policy control entity in a wireless communications network is provided, wherein a multipath transmission with at least two data packet sessions can be provided in the wireless communications network between a content provider and a user equipment, wherein a first data packet session of the at least two data packet sessions is transmitted through the wireless communications network over a cellular access node and a second data packet sessions of the at least two data packet sessions is transmitted through the wireless communications network over a non-cellular access node. The method comprises a step of receiving an establishment request from a network exposure entity to set up the multipath transmission, the establishment request comprising multipath information including a multipath indicator, indicating that the multipath transmission is requested, and a flow description for the first data packet session and the second data packet session. The method further comprises a step of determining, for at least the first data packet session and the second data packet session, a multipath transmission policy. The method further comprises a step of transmitting, in response to the establishment request, a response message to the network exposure entity including the multipath transmission policy.

Another aspect furthermore relates to a policy control entity comprising a processing unit and a memory, the memory comprising instructions configured to cause the processing unit to carry out the steps described above for the method for operating the policy control entity.

According to another aspect, a policy control entity for a wireless communications network is provided, wherein a multipath transmission with at least two data packet sessions can be provided in the wireless communications network between a content provider and a user equipment, wherein a first data packet session of the at least two data packet sessions is transmitted through the wireless communications network over a cellular access node and a second data packet sessions of the at least two data packet sessions is transmitted through the wireless communications network over a non-cellular access node. The policy control entity comprises a first module for receiving an establishment request from a network exposure entity to set up the multipath transmission, the establishment request comprising multipath information including a multipath indicator, indicating that the multipath transmission is requested, and a flow description for the first data packet session and the second data packet session. The policy control entity further comprises a second module for determining, for at least the first data packet session and the second data packet session, a multipath transmission policy. The policy control entity further comprises a third module for transmitting, in response to the establishment request, a response message to the network exposure entity including the multipath transmission policy.

According to another aspect, a method for operating a network exposure entity in a wireless communications network is provided, wherein a multipath transmission with at least two data packet sessions can be provided in the wireless communications network between a content provider and a user equipment, wherein a first data packet session of the at least two data packet sessions is transmitted through the wireless communications network over a cellular access node and a second data packet sessions of the at least two data packet sessions is transmitted through the wireless communications network over a non-cellular access node. The method comprises a step of receiving an establishment request from the content provider to set up the multipath transmission, the establishment request comprising multipath information including a multipath indicator, indicating that the multipath transmission is requested, and a flow description for the first data packet session and the second data packet session. The method further comprises a step of determining, for at least the first data packet session and the second data packet session, a multipath transmission policy. The method further comprises a step of transmitting, in response to the establishment request, a response message to the content provider including the multipath transmission policy.

Another aspect furthermore relates to a network exposure entity comprising a processing unit and a memory, the memory comprising instructions configured to cause the processing unit to carry out the steps described above for the method for operating the network exposure entity.

According to another aspect, a network exposure entity for a wireless communications network is provided, wherein a multipath transmission with at least two data packet sessions can be provided in the wireless communications network between a content provider and a user equipment, wherein a first data packet session of the at least two data packet sessions is transmitted through the wireless communications network over a cellular access node and a second data packet sessions of the at least two data packet sessions is transmitted through the wireless communications network over a non-cellular access node. The network exposure entity comprises a first module for receiving an establishment request from the content provider to set up the multipath transmission, the establishment request comprising multipath information including a multipath indicator, indicating that the multipath transmission is requested, and a flow description for the first data packet session and the second data packet session. The network exposure entity further comprises a second module for determining, for at least the first data packet session and the second data packet session, a multipath transmission policy. The network exposure entity further comprises a third module for transmitting, in response to the establishment request, a response message to the content provider including the multipath transmission policy.

According to another aspect, a method for operating a content provider is provided, the content provider being configured for sending data over a wireless communications network, in which a multipath transmission with at least two data packet sessions can be provided between the content provider and a user equipment, wherein a first data packet session of the at least two data packet sessions is transmitted through the wireless communications network over a cellular access node and a second data packet sessions of the at least two data packet sessions is transmitted through the wireless communications network over a non-cellular access node. The method comprises a steps of transmitting an establishment request to a network exposure entity to set up the multipath transmission, the establishment request comprising multipath information including a multipath indicator, indicating that the multipath transmission is requested, and a flow description for the first data packet session and the second data packet session. The method further comprises a step of receiving, in response to the establishment request, a response message from the network exposure entity including a multipath transmission policy. The method further comprises a step of setting a multipath configuration of the content provider with respect to the user equipment based on the multipath transmission policy.

Another aspect furthermore relates to a content provider comprising a processing unit and a memory, the memory comprising instructions configured to cause the processing unit to carry out the steps described above for the method for operating the content provider.

According to another aspect, a content provider is provided, the content provider being configured for sending data over a wireless communications network, in which a multipath transmission with at least two data packet sessions can be provided between the content provider and a user equipment, wherein a first data packet session of the at least two data packet sessions is transmitted through the wireless communications network over a cellular access node and a second data packet sessions of the at least two data packet sessions is transmitted through the wireless communications network over a non-cellular access node. The content provider comprises a first module for transmitting an establishment request to a network exposure entity to set up the multipath transmission, the establishment request comprising multipath information including a multipath indicator, indicating that the multipath transmission is requested, and a flow description for the first data packet session and the second data packet session. The content provider further comprises a second module for receiving, in response to the establishment request, a response message from the network exposure entity including a multipath transmission policy. The content provider further comprises a third module for setting a multipath configuration of the content provider with respect to the user equipment based on the multipath transmission policy.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

Other devices, systems, methods, features and advantages will be or will become apparent to one with skill in the art upon examination of the following detailed description and figures. It is intended that all such additional systems, methods, features and advantages be included within this description, be within the scope of the invention and be protected by the following claims.

DETAILED DESCRIPTION OF DRAWINGS

Various features of embodiments will become more apparent when read in conjunction with the accompanying drawings. In these drawings:

FIG. 1 schematically illustrates the 5G NR reference architecture as defined by 3GPP;

DETAILED DESCRIPTION OF EMBODIMENTS

Figure 1:
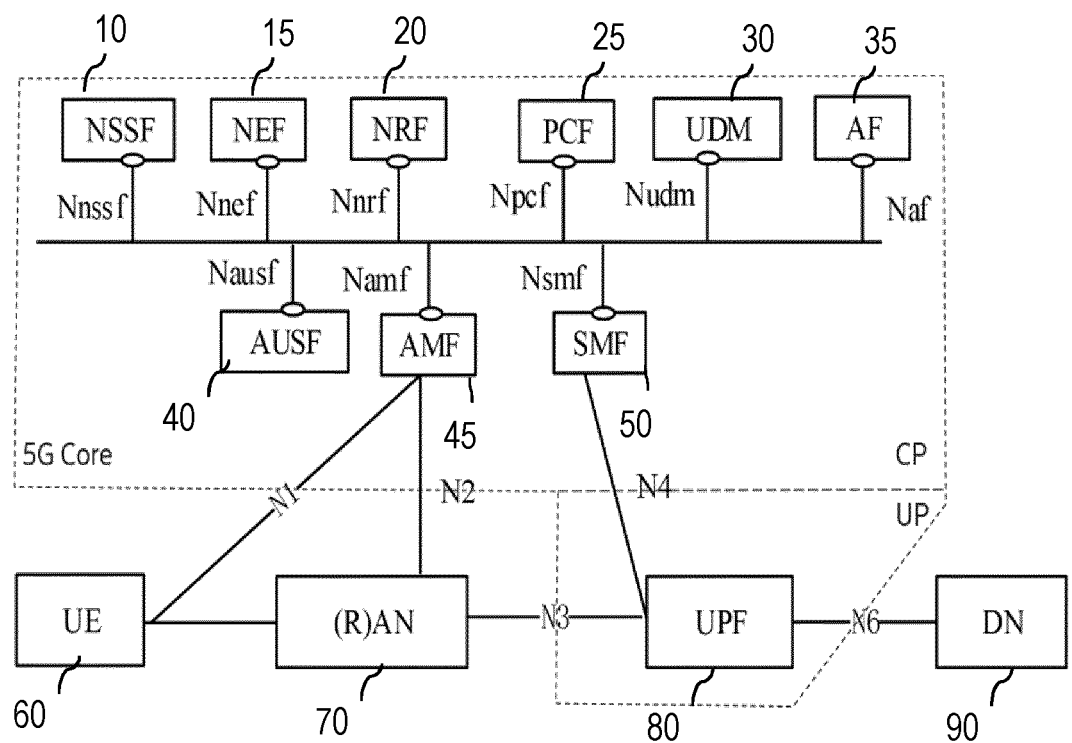

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Figure 2:
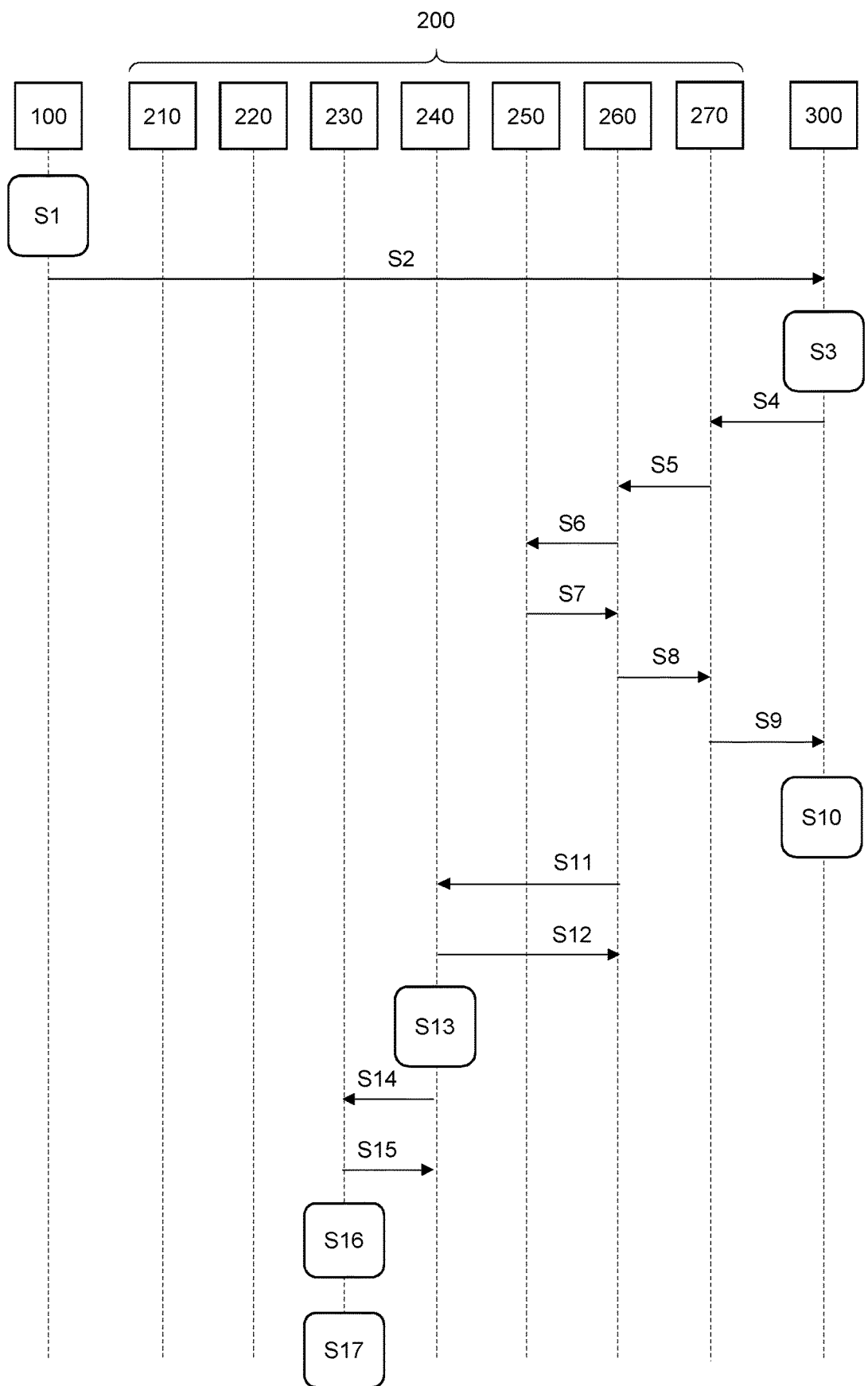
FIG. 2 shows an example flowchart of a method carried out by a wireless communications network for implementing a multipath transmission.

FIG. 2 shows an example flowchart of a method carried out by a wireless communications network 200 for implementing a multipath transmission between a content provider 300 and a user equipment 100.

Within the context of the present application, the term "mobile entity" or "user equipment" (UE) 100 refers to a device for instance used by a person (i.e. a user) for his or her personal communication. It can be a telephone type of device, for example a telephone or a Session Initiating Protocol (SIP) or Voice over IP (VoIP) phone, cellular telephone, a mobile station, cordless phone, or a personal digital assistant type of device like laptop, notebook, notepad, tablet equipped with a wireless data connection. The UE may also be associated with non-humans like animals, plants, or machines. A UE may be equipped with a SIM (Subscriber Identity Module) or electronic-SIM comprising unique identities such as IMSI (International Mobile Subscriber Identity), TMSI (Temporary Mobile Subscriber Identity), or GUTI (Globally Unique Temporary UE Identity) associated with the user using the UE. The presence of a SIM within a UE customizes the UE uniquely with a subscription of the user.

For the sake of clarity, it is noted that there is a difference but also a tight connection between a user and a subscriber. A user gets access to a network by acquiring a subscription to the network and by that becomes a subscriber within the network. The network then recognizes the subscriber (e.g. by IMSI, TMSI or GUTI or the like) and uses the associated subscription to identify related subscriber data. A user is the actual user of the UE, and the user may also be the one owning the subscription, but the user and the owner of the subscription may also be different. E.g. the subscription owner may be the parent, and the actual user of the UE could be a child of that parent.

The wireless communications network 200 is generally any communication network which allows a wireless communications with the user equipment 100. In some embodiments, the wireless communications network 200 can be an LTE network or a 5G NR network.

The wireless communications network 200 comprises a cellular access node 210 and a non-cellular access node 220. The cellular access node 210 can be any access node allowing a cellular communication such as a 3GPP access node, for instance an LTE or 5G NR access node. The non-cellular access 220 node can be any access node allowing a wireless communication other than a cellular communication, such as WiFi or Bluetooth, or a wired communication, such as Ethernet.

The wireless communications network 200 further comprises a user plane entity 230. The user plane entity 230 can generally at least support handling of user plane traffic based on the rules received from the session control entity 240. The user plane entity 230 can thus, for instance, carry out packet inspection and different enforcement actions such as QoS, charging, etc., specific to the user equipment 100. In a 5G NR implementation, the user plane entity 230 can be implemented by the UPF (User Plane function). In a LTE implementation, the network user plane entity 230 can be implemented by the PGW-U (User plane of the Packet Data Network Gateway) and/or by the TDF-U (User plane of the Traffic Detection Function).

The wireless communications network 200 further comprises a session control entity 240. The session control entity 240 can generally at least receive PCC (Policy and Charging Control) rules from the policy control entity 260 and configure the user plane entity 230 accordingly. In a 5G NR implementation, the session control entity 240 can be implemented by the SMF (Session Management function). In a LTE implementation, the session control entity 240 can be implemented by the PGW-C(Control plane of the Packet Data Network Gateway) and/or by the TDF-C(Control plane of the Traffic Detection Function).

The wireless communications network 200 further comprises a data repository 250. The data repository 250 can generally at least allow storing and retrieving of data, such as policy and/or configuration data. In a 5G NR implementation, the data repository 250 can be implemented by the UDR (Unified Data Repository). In a LTE implementation, the data repository 250 can be implemented by the SPR (Subscription Profile Repository) as described, for instance, by 3GPP TS 23.203, particularly in FIG. 5.1.1 and the respective description.

The wireless communications network 200 further comprises a policy control entity 260. The policy control entity can 260 generally at least support unified policy framework to govern the behaviour of wireless communications network 200. For instance, the policy control entity 260 can provide PCC (Policy and Charging Control) rules to session control entity 240. In a 5G NR implementation, the policy control entity 260 can be implemented by the PCF (Policy Control Function). In a LTE implementation, the policy control entity 260 can be implemented by the PCRF (Policy and Charging Rules Function).

The wireless communications network 200 further comprises a network exposure entity 270. The network exposure entity 270 can generally at least allow the wireless communications network 200 to communicate with nodes external to the wireless communications network 200, such as the content provide 300, and expose information describing the capabilities and/or configuration of the wireless communications network 200. In a 5G NR implementation, the network exposure entity 270 can be implemented by the NEF (Network Exposure Function). In a LTE implementation, the network exposure entity 270 can be implemented by the SCEF (Service Capability Exposure Function).

The content provider 300 can be a node which can provide content to the user equipment 100 over the wireless communications network 200. For instance, the content provider 300 can be a server. In a 5G NR implementation, the content provider 300 can be implemented by the AF (Application Function). In a LTE implementation, the content provider 300 can be implemented by the SCS/AF (Service Capability Server/Application Function).

It is understood that any of the user equipment 100, content provider 300, and any of the entities of the wireless communications network 200 can be implemented by hardware, firmware and/or software, alone or in combination with other entities.

The method illustrated in FIG. 2 illustrates a possible behaviour of several of the entities described above. As it will become clear from the following description, the invention does not necessarily need all the steps illustrated in FIG. 2 to be implemented.

Step S1, for initiating multipath application, is carried out by the user equipment 100. In some embodiments, the user equipment 100 is instructed to start an application such as, for instance, YouTube, and to use a multipath configuration for the application. In some embodiments the multipath configuration can be, for instance, native L4 multipath such as MP-TCP. In general, the multipath transmission is carried over at least two data packet sessions which are to be provided between the content provider 300 and the user equipment 100, over the wireless communications network 200. The at least two data packet sessions can comprise a first data packet session and a second data packet session. The first data packet session can be transmitted through the wireless communications network 200 over the cellular access node 210. The second data packet sessions can be transmitted through the wireless communications network 200 over the non-cellular access node 220.

At step S1, the user equipment 100 generates a multipath establishment request. That is, the user equipment 100 generates one or more messages comprising data for requesting and/or configuring, or at least for starting the process of configuring, the multipath transmission with the content provider 300.

In some embodiments, when carrying out step S1, the user equipment 100 is registered to the same PLMN (Public Land Mobile Network) via both the cellular access node 210 and non-cellular access node 220, so that the respective at least two data packet sessions can be established. For the sake of simplicity, in the present description, it is assumed the same session control entity 240 and user plane entity 230 are associated to both the at least two data packet sessions. It will however be clear that the invention can also be applied in the more general case in which different session control entity 240 and user plane entity 230 are associated to different data packet sessions.

Step S2, for transmitting/receiving the multipath establishment request, is carried out by the user equipment 100. In this step, the user equipment 100 transmits the multipath establishment request, that is the one or more messages generated at step S1, to the content provider 300, over the wireless communications network 200.

Step S3, for generating an establishment request, is carried out by the content provider upon reception of the multipath establishment request received at step S2. At step S3, the content provider 300 generates an establishment request. That is, the content provider 300 generates one or more messages comprising data for requesting and/or configuring, or at least for starting the process of configuring, the multipath transmission with the wireless communications network 200.

Step S4, for transmitting/receiving the establishment request, is carried out as a transmission by the content provider 300 and as a reception by the network exposure entity 270. In this step, the content provider 300 transmits the establishment request, that is the one or more messages generated at step S3, to the network exposure entity 270, so as to set up the multipath transmission over the wireless communications network 200.

In some embodiments, the establishment request can comprise multipath information. The multipath information can include a multipath indicator, indicating that the multipath transmission is requested, and a flow description for the first data packet session and the second data packet session. Thanks to this, the wireless communications network 200 can be informed of the multipath transmission between the content provider 300 and the user terminal 100. As will become clearer in the following, this advantageously allows the wireless communications network 200 to take into consideration this information when operating. Alternatively, or in addition, as will become clearer in the following, this advantageously allows the wireless communications network 200 to provide the content provider 300 with preferred policies for the configuration of the multipath transmission.

The multipath indicator can be implemented in any way which allows the wireless communications network 200 to be informed that a multipath transmission is being set up, such as a flag bit.

The flow description for the first data packet session and the second data packet session can be implemented in any way which allows the wireless communications network 200 to recognize the data packets belonging to the first data packet session and the second data packet session.

In some embodiments, the flow description can comprise at least an address, such as an IP address, of the content provider 300 and one or more addresses, such as IP addresses, of the user equipment 100. This advantageously allows to identify the various data packet sessions between the address of the content provider 300 and the plurality of addresses of the user equipment 100.

Alternatively, or in addition, in some embodiments, the flow description can comprise at least a first flow description, for the first data packet session, and a second flow description, for the second data packet session. The first flow description can comprise at least an address, such as an IP address, of the content provider 300, and an address, such as an IP address, of the user equipment 100 over the cellular access node 210. The second flow description can comprise at least an address, such as an IP address, of the content provider 300, and an address, such as an IP address, of the user equipment 100 over the non-cellular access node 220. This advantageously allows to identify the various data packet sessions between the address of the content provider 300 and the user equipment 100 over the cellular access node 210 and over the non-cellular access node 220.

Both implementations above allow the size of the establishment request to be advantageously contained, as the address of the content provider 300 can be indicated only once, for the various data packet sessions of the multipath transmission.

Still alternatively, or in addition, in some embodiments, the flow description can comprise at least a first flow description, for the first data packet session, and a second flow description, for the second data packet session. The first flow description can comprise a 5-tuple descriptive of the first data packet session, and the second flow description can comprise a 5-tuple descriptive of the second data packet session. Each 5-tuple can comprise an IP address and port of the content provider 300, an IP address and port of the user equipment 100, over the respective access node, and the protocol in use for the data packet session.

Still alternatively, or in addition, the establishment request can be implemented by an HTTP POST message. In some embodiments, one HTTP POST message can be implemented for all data packet session of the multipath transmission. The body of HTTP POST message can include one or more of:
- an external identifier of the content provider 300, such as "Google Inc.";
- an external identifier of the application for which the multipath transmission is being established, such as "YouTube";
- an external subscription identifier, for instance GPSI in 5G NG, such as MSISDN (Mobile Station International Subscriber Directory Number) or an External Identifier;
- multipath information, as described above.

Alternatively, or in addition, in some embodiments, one HTTP POST message can be implemented for each data packet session. In this case, the multipath information can be limited to the information relating to the specific data packet session.

In preferred embodiments of the invention, in particular in the context of a 5G NG implementation, the establishment request can be implemented as an extension of the Nnef interface of the NEF.

Step S5, for transmitting/receiving a second establishment request, is carried out as a transmission by the network exposure entity 270 and as a reception by the policy control entity 260. In this step, the network exposure entity 270, based on the establishment request received at step S4, transmits a second establishment request to the policy control entity 260.

In some embodiments, the content of the second establishment request can be the same as the content of the establishment request. In some embodiments, the content of the establishment request of step S4 and the content of the second establishment request S5 may differ by replacing external identifiers in the establishment request of step S4 with internal identifiers in the second establishment request of step S5. The network exposure entity 270 can carry out the such replacement.

In some embodiments, the second establishment request can be implemented by an HTTP POST message. Preferably, the network exposure entity 270 can:
- map the an external identifier of the of the content provider 300 to an internal identifier of the content provider 300;
- map the external identifier of the application to an internal identifier of the application;
- map the external subscription identifier to an internal subscription identifier, such as SUPI (Subscription Permanent Identifier);

so that the HTTP POST message can comprise one or more of:
- the internal identifier of the content provider 300;
- the internal identifier of the application;
- the internal subscription identifier;
- the multipath information, as described above, In preferred embodiments of the invention, in particular in the context of a 5G NG implementation, the second establishment request can be implemented as an extension of the Npcf interface of the PCF.

Step S6, for transmitting/receiving a transmission policy request, is carried out as a transmission by the policy control entity 260 and as a reception by the data repository 250. In this step, the policy control entity 260, based on the establishment request received at step S5, transmits a transmission policy request to the data repository 250. The transmission policy request generally requests the data repository 250 to provide a preferred policy for multipath transmission for the user equipment 100.

In some embodiments, the content of the transmission policy request can comprise the internal subscription identifier. In preferred embodiments of the invention, in particular in the context of a 5G NG implementation, the transmission policy request can be implemented as an extension of the Nudr interface of the UDR.

Step S7, for transmitting/receiving a multipath transmission policy, is carried out as a transmission by data repository 250 and as a reception by the policy control entity 260. In this step, the data repository 250, based on the transmission policy request received at step S6, transmits a multipath transmission policy to the policy control entity 260. The multipath transmission policy generally comprises an indication of one or more parameters for a preferred configuration of the multipath transmission.

In particular, in some embodiments, the content of the multipath transmission policy can comprise one or more of:
- Active-Standby identifier: in this case traffic between the content provider 300 and the user equipment 100 is routed entirely through one data packet session, the active session, when this session is available, for instance when the user equipment 100 has access to the session through the respective access node. When the active session is not available, for instance when the respective access node is not reachable by user equipment 100, the traffic is routed entirely through another packet session, the standby session;
- Smallest-Delay identifier: in this case traffic between the content provider 300 and the user equipment 100 is routed through the data packet session which is determined to have the smallest RTT (Round-Trip Time);

Load-Balancing identifier: in this case traffic between the content provider 300 and the user equipment 100 is split traffic across two or more data packet sessions. In some embodiments, the Load-Balancing identifier may further comprise a splitting ratio across the two or more data packet sessions. For instance, when two data packet sessions are implemented in the multipath transmission, a 50/50 splitting ratio indicates that the traffic is equally split across the two data packet sessions while an 80/20 splitting ratio indicates that the traffic is split 80% across the first data packet session and 20% across the second data packet session;

Priority-based identifier: in this case traffic between the content provider 300 and the user equipment 100 is routed through one data packet session, the high priority session, until a congestion arises. Upon detecting a congestion on the high priority session, traffic is routed through another data packet session, the low priority session, by splitting traffic over the two data packet sessions. In addition, when the high priority session becomes unavailable, all traffic is switched to the low priority session.

Thanks to steps S6 and S7, it is therefore possible for the policy control entity 260 to determine, for at least the first data packet session and the second data packet session, a multipath transmission policy, based on the multipath transmission policy provided by the data repository 250. In some embodiments, the policy control entity 260 can then map the various sessions identified in the transmission policy, such as the active session, the standby session, the high priority session, the low priority session, etc. to the at least two data packet sessions associated to the various access nodes.

Step S8, for transmitting/receiving the response message, is carried out as a transmission by the policy control entity 260 and as a reception by the network exposure entity 270. In this step, in response to the establishment request, a response message is sent to the network exposure entity 270, including the multipath transmission policy.

Thanks to steps S5 and S8, it is therefore possible for the network exposure entity 270 to determine, for at least the first data packet session and the second data packet session, a multipath transmission policy, based on the multipath transmission policy provided by the data repository 250.

Step S9, for transmitting/receiving the response message, is carried out as a transmission by the network exposure entity 270 and as a reception by the content provider 300. In this step, in response to the establishment request, a response message is sent to the content provider 300, including the multipath transmission policy.

Step S10, for setting multipath configuration, is carried out by the content provider 300 upon reception of the multipath transmission policy received at step S9. At step S10, the content provider 300 sets a multipath configuration with respect to the user equipment 100, based on the multipath transmission policy. That is, the content provider 300 takes into account the multipath transmission policy indicated by the wireless communications network 200 in order to steer traffic to the user equipment 100, across the at least two data packet sessions.

Thanks to the above steps, the content provider 300 can be provided with the preferred multipath transmission policy associated to the user equipment 100 within wireless communications network 200. This allows the wireless communications network 200 to control the establishment of the multipath transmission so as to take into account preferences of the network operator and/or of the user equipment 100.

Moreover, the method described above also advantageously allows the wireless communications network 200 to be informed of the existence and of the configuration of the multipath transmission. This information can advantageously be used, internally to the wireless communications network 200, in order to provide new functionalities. One of those new advantageous functionality is described in the following with reference to steps S11-S17. It will be clear that those steps are to be considered optional when implementing the invention. It will be further clear that alternative advantageous uses of the information concerning the existence and the configuration of the multipath transmission can be implemented. In general, one advantage of steps S11-S17 is to allow applying differentiated treatment, such as differentiated charging, for the flows corresponding to one access type and the flows corresponding to the another access type, such as for the first data packet and for the second data packet. Without the implementation of the invention, the flows would be de-correlated from each other, as they would pertain to separate PDU sessions.

Step S11, for transmitting/receiving a transmission policy, is carried out as a transmission by the policy control entity 260 and as a reception by the session control entity 240. In this step, the policy control entity 260, based on the multipath transmission policy received at step S7, transmits a transmission policy to the session control entity 240. In some embodiments, where the first data packet session and the second data packet session are associated to different session control entities 240, step S11 can transmit, to each session control entity 240 configured to respectively control the first data packet session and the second data packet session, a corresponding transmission policy with a corresponding flow description.

In particular, the transmission policy can comprise, for each data packet session, at least the respective flow description. The flow description can be indicated according to any manner previously described. Moreover, the transmission policy can comprise for each data packet session, a rating group information, identifying a rating group associated to the one or more data packet sessions. That is, for instance in case of differentiated charging for traffic used on different data packet sessions, the charging of the respective data packet session can be set based on the multipath information.

Still alternatively, or in addition, the transmission policy can be implemented by an HTTP POST message. In some embodiments, one HTTP POST message can be implemented for all data packet session of the multipath transmission. The body of HTTP POST message can then include one or more of:
  multipath information, as described above;
  rating group information, identifying a rating group associated to the one or more data packet sessions.

Alternatively, or in addition, in some embodiments, one HTTP POST message can be implemented for each data packet session. In this case, the multipath information and the rating group information can be limited to the information relating to the specific data packet session.

In preferred embodiments of the invention, in particular in the context of a 5G NG implementation, the transmission policy can be implemented as an Nsmf SMPolicyControl message, for each data packet session, including a respective rating group.

Step S12, for transmitting/receiving a confirmation, is carried out as a transmission by the session control entity 240 and as a reception by the policy control entity 260. In this step, the session control entity 240 confirms to the policy control entity 260 that the transmission policy transmitted at step S11 has been received.

Step S13, for determining detection rules and/or reporting rules based on the transmission policy, is carried out by the session control entity 240 upon reception of the transmission policy received at step S11. In this step, the session control entity 240 generates filtering rules and/or reporting rules based on the flow description received in step S4.

Step S14, for transmitting/receiving the detection rules and/or the reporting rules, is carried out as a transmission by the session control entity 240 and as a reception by the user plane entity 230. In this step, the session control entity 240 transmits to the user plane entity 230 the detection rules and/or the reporting rules determined at step S13. This advantageously allows the user plane entity 230 to detect traffic corresponding to a given data packet session and to apply differentiated treatment based on the different data packet sessions, for instance with respect to FAR (Forwarding Action Rule) and/or QER (QoS Enforcement Rule).

For instance, in some embodiments, the detection rules and/or the reporting rules transmitted to the user plane entity 230 can be implemented by one or more messages, each of which can include one or more of:
- a first filtering rule based on a first flow description received in step S11;
- a first reporting rule for the first flow description;
- a second filtering rule based on a second flow description received in step S11;
- a second reporting rule for the second flow description.

In a 5G implementation, the one or more messages can be implemented by a N4 PFCP session modification request, for modifying the PFCP session. Alternatively, or in addition, the first filtering rule can be implemented by a PDR having a SDF (Service Data How) filter corresponding to the first flow description. Similarly, the second filtering rule can be implemented by a PDR having a SDF (Service Data How) filter corresponding to the second flow description. Alternatively, or in addition, the first reporting rule can be implemented by a URR (Usage Reporting Rule) associated to the first flow description. Similarly, the second reporting rule can be implemented by a URR (Usage Reporting Rule) associated to the second flow description.

This allows, for instance, a volume corresponding to the data packet sessions transmitted over the cellular access node 210 to be reported according to a first URR and a volume corresponding to the data packet sessions transmitted over the non-cellular access node 220 to be reported according to a second URR. This allows, for instance, for differentiated charging of the traffic volume over the cellular access node 210 and over the non-cellular access node 220.

Step S15, for transmitting/receiving a confirmation, is carried out as a transmission by the user plane entity 230 and as a reception by the session control entity 240. In this step, the user plane entity 230 confirms to the session control entity 240 that the detection rules and/or the reporting rules transmitted at step S14 has been received.

At step S16, the user plane entity 230 detects the traffic based on the received filtering rules.

At step S17, the user plane entity 230 reports the detected traffic based on the received reporting rules.

Although the method above has been described with reference to FIG. 2, comprising a plurality of steps implemented by a plurality of nodes, it will be clear that the invention can be implemented by a subset of those steps, carried out by one or more nodes.

Figure 3:
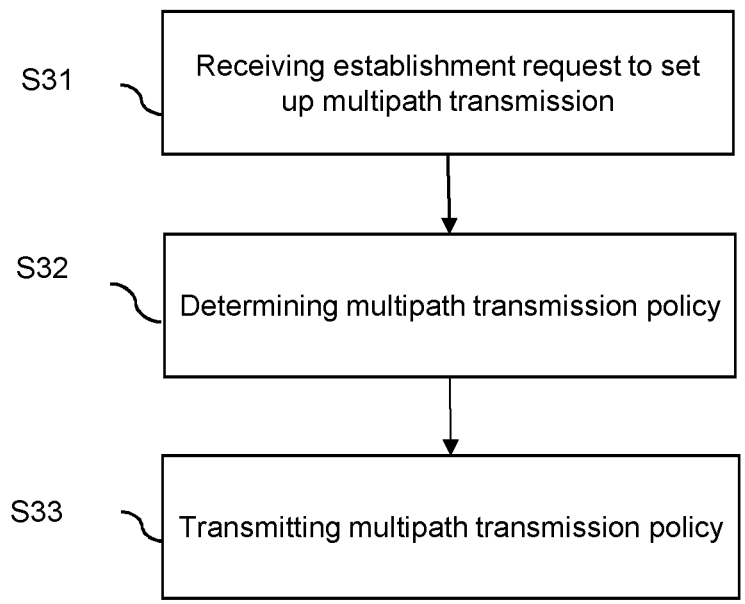
FIG. 3 shows an example flowchart of a method carried out by a policy control entity for implementing a multipath transmission in a wireless communications network.

In particular, FIG. 3 shows an example flowchart of a method carried out by policy control entity 260, for implementing the multipath transmission in wireless communications network 200. The method comprises steps S31, S32, and S33. In some embodiments, step S31, can correspond to S5 as described above, S32 can correspond to S6 and S7 as descried above, S33 can correspond to S8 as described above.

At step S31, the policy control entity 260 receives an establishment request to set up a multipath transmission. This establishment request can be transmitted by the network exposure entity 270. The establishment request, the content of which can correspond to what has been described above with reference to step S5, generally allows the policy control entity 260 to be requested to provide information for the establishment of the multipath transmission.

At step S32, responsive to the establishment request received at step S31, the policy control entity 260 determines, for at least the first data packet session and the second data packet session, a multipath transmission policy. This can be done, for instance, based on a multipath transmission policy provided by the data repository 250. In particular, step S32 can carry out the previously described steps S6 and S7 in order to retrieve the multipath transmission policy from the data repository 250. The multipath transmission policy, the content of which can correspond to what has been described above with reference to step S7, generally allows the policy control entity 260 to be informed of a preferred configuration of the multipath transmission for a given user equipment 100.

At step S33, responsive to the multipath transmission policy received at step S32, the policy control entity 260 transmits a response message comprising the multipath transmission policy. This message is preferably transmitted to the network exposure entity 270. The response message, the content of which can correspond to what has been described above with reference to step S8, generally allows the policy control entity 260 to forward the preferred configuration of the multipath transmission for the given user equipment 100 to another network entity.

Figure 4:
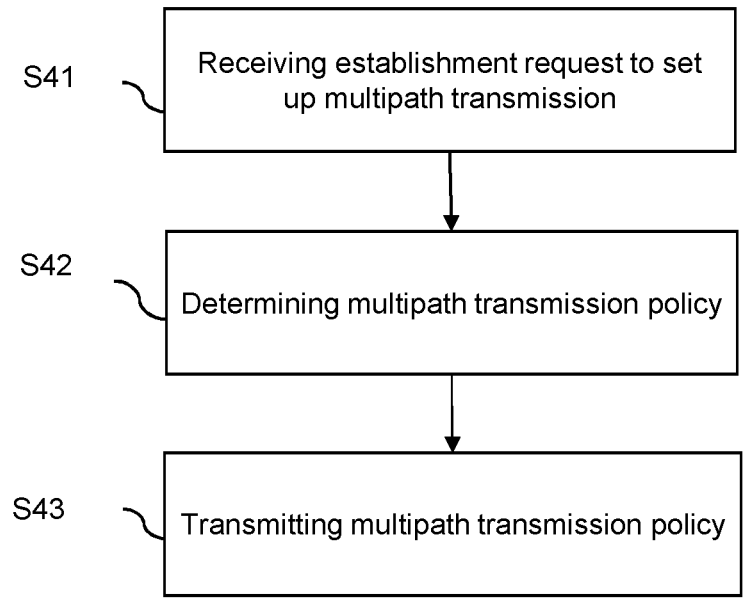
FIG. 4 shows an example flowchart of a method carried out by a network exposure entity for implementing a multipath transmission in a wireless communications network.

FIG. 4 shows an example flowchart of a method carried out by network exposure entity 270 for implementing a multipath transmission in wireless communications network 200. The method comprises steps S41, S42 and S43. In some embodiments, step S41, can correspond to S4 as described above, S42 can correspond to S5 and S8 as descried above, S43 can correspond to S9 as described above as described above.

At step S41, the network exposure entity 270 receives an establishment request to set up a multipath transmission. This establishment request can be transmitted by the content provider 300. The establishment request, the content of which can correspond to what has been described above with reference to step S4, generally allows the network exposure entity 270 to be requested to provide information for the establishment of the multipath transmission.

At step S42, responsive to the establishment request received at step S41, the network exposure entity 270 determines, for at least the first data packet session and the second data packet session, a multipath transmission policy. This can be done, for instance, based on a multipath transmission policy provided by the policy control entity 260. In particular, step S42 can carry out the previously described steps S5, S8 in order to retrieve the multipath transmission policy from the policy control entity 260. The multipath transmission policy, the content of which can correspond to what has been described above with reference to step S8, generally allows the network exposure entity 270 to be informed of a preferred configuration of the multipath transmission for a given user equipment 100.

At step S43, responsive to the multipath transmission policy received at step S42, the network exposure entity 270 transmits a response message comprising the multipath transmission policy. This message is preferably transmitted to the content provider 300. The response message, the content of which can correspond to what has been described above with reference to step S9, generally allows the network exposure entity 270 to forward the preferred configuration of the multipath transmission for the given user equipment 100 to an entity external to the wireless communications network 200.

Figure 5:
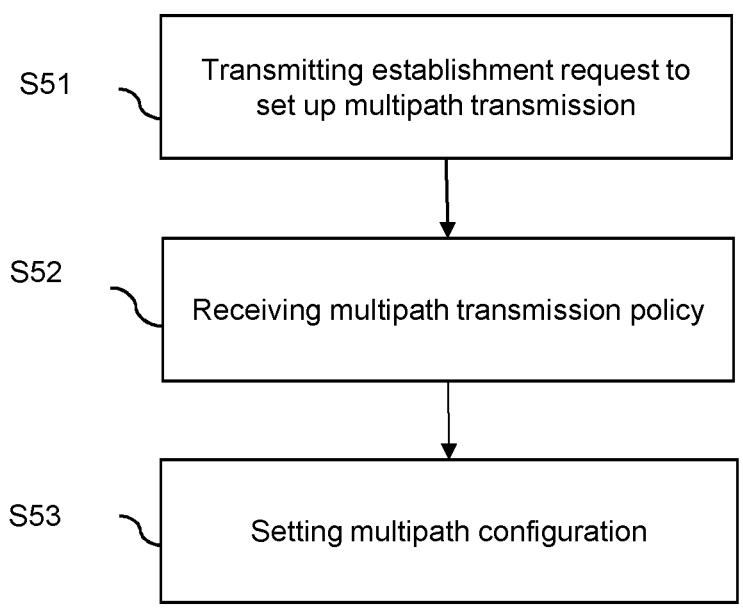
FIG. 5 shows an example flowchart of a method carried out by a content provider for implementing a multipath transmission in a wireless communications network.

FIG. 5 shows an example flowchart of a method carried out by content provider 300 for implementing a multipath transmission in wireless communications network 200. The method comprises steps S51, S52, and S53. In some embodiments, step S51, can correspond to S4 as described above, S52 can correspond to S9 as descried above, S53 can correspond to S10 as described above as described above.

At step S51, the content provider 300 transmits an establishment request to set up a multipath transmission. This establishment request can be transmitted to the network exposure entity 270. The establishment request, the content of which can correspond to what has been described above with reference to step S4, generally allows the content provider 300 to request to the wireless network 200 to provide information for the establishment of the multipath transmission.

At step S52, responsive to the establishment request sent at step S51, the content provider 300 receives a response message including a multipath transmission policy. This can be sent, for instance, from the network exposure entity 270. The multipath transmission policy, the content of which can correspond to what has been described above with reference to step S9, generally allows the content provider 300 to be informed of a preferred configuration of the multipath transmission for a given user equipment 100.

At step S53, the content provider 300 sets a multipath configuration with respect to the user equipment 100, based on the multipath transmission policy.

Moreover, although the description above has been discussed in terms of method steps, it will be clear that the invention can also be implemented by respective devices.

Figure 6:
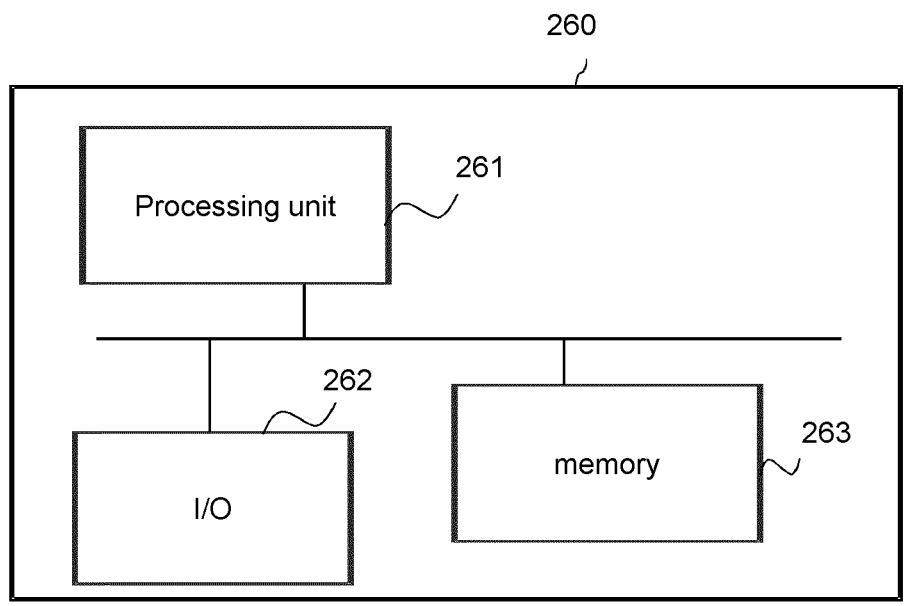
FIG. 6 shows an example schematic of a policy control entity configured for implementing a multipath transmission in a wireless communications network.
Figure 10:
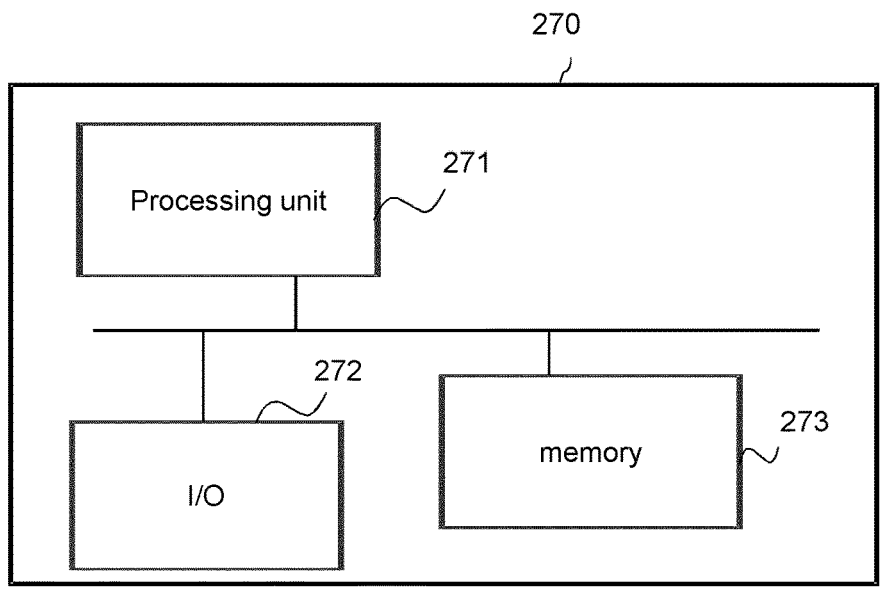
FIG. 10 shows an example schematic of a network exposure entity configured for implementing a multipath transmission in a wireless communications network.
Figure 13:
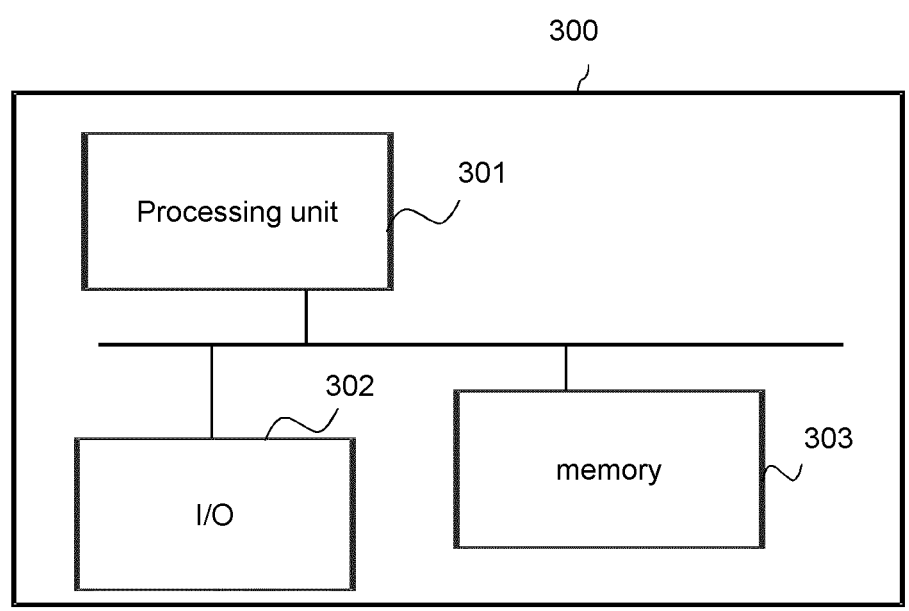
FIG. 13 shows an example schematic of a content provider configured for implementing a multipath transmission in a wireless communications network.

In particular, FIG. 6 shows an example schematic of a policy control entity 260, configured for implementing a multipath transmission in wireless communications network 200, comprising a processing unit 261 and a memory 263. The memory 263 can comprise instructions configured to cause the processing unit 261 to carry out any of steps S5, S6, S7, S8, and S11-S12 as described above. Alternatively, or in addition, the memory 263 can comprise instructions configured to cause the processing unit 261 to carry out any of steps S31, S32 and S33 as described above. Similarly, FIG. 10 shows an example schematic of a network exposure entity 270 configured for implementing a multipath transmission in wireless communications network 200, comprising a processing unit 271 and a memory 273. The memory 273 can comprise instructions configured to cause the processing unit 271 to carry out any of steps S4, S5, S8, and S9 as described above. Alternatively, or in addition, the memory 273 can comprise instructions configured to cause the processing unit 271 to carry out any of steps S41, S42 and S43 as described above. Similarly, FIG. 13 shows an example schematic of a content provider 300 configured for implementing a multipath transmission in wireless communications network 200, comprising a processing unit 301 and a memory 303. The memory 303 can comprise instructions configured to cause the processing unit 301 to carry out any of steps S2, S3, S4, S9, and S10 as described above. Alternatively, or in addition, the memory 303 can comprise instructions configured to cause the processing unit 301 to carry out any of steps S51, S52 and S53 as described above Moreover, the respective devices for implementing the invention can be also defined in terms of modules.

Figure 7:
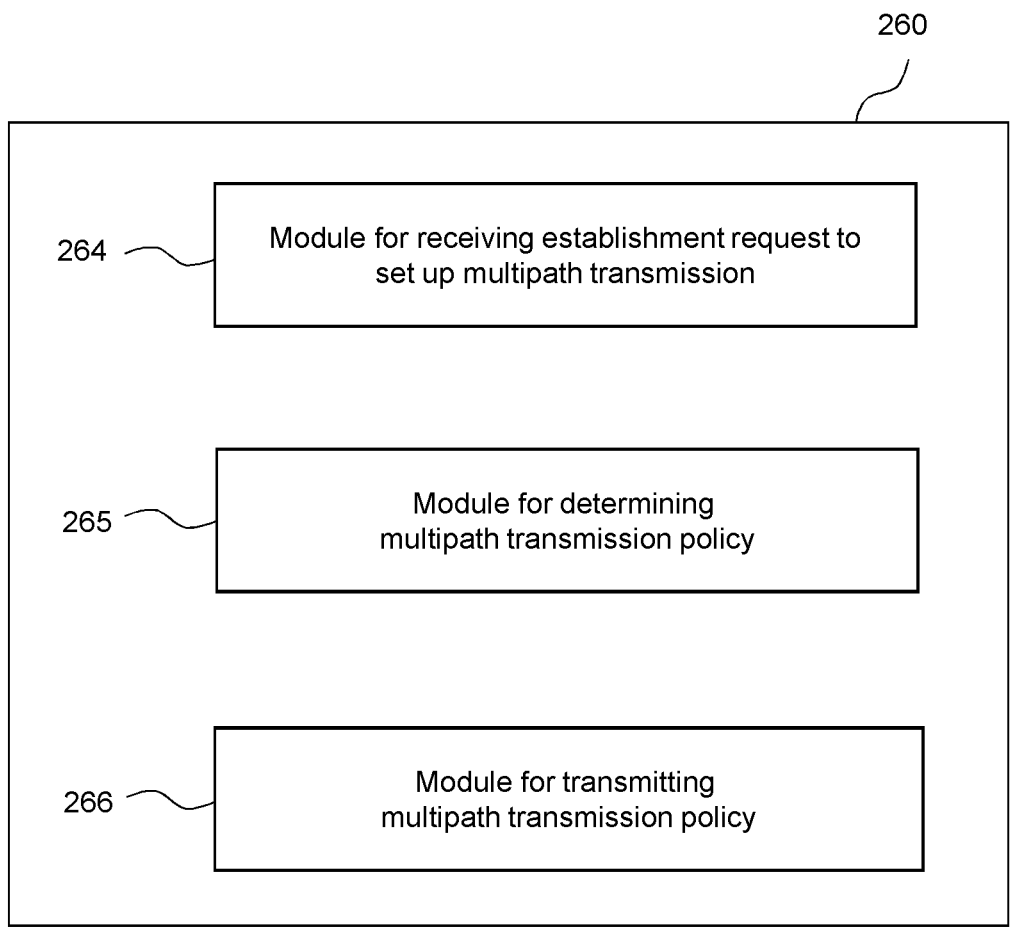
FIGS. 7-9 show example schematics of modules of a policy control entity for implementing a multipath transmission in a wireless communications network.
Figure 8:
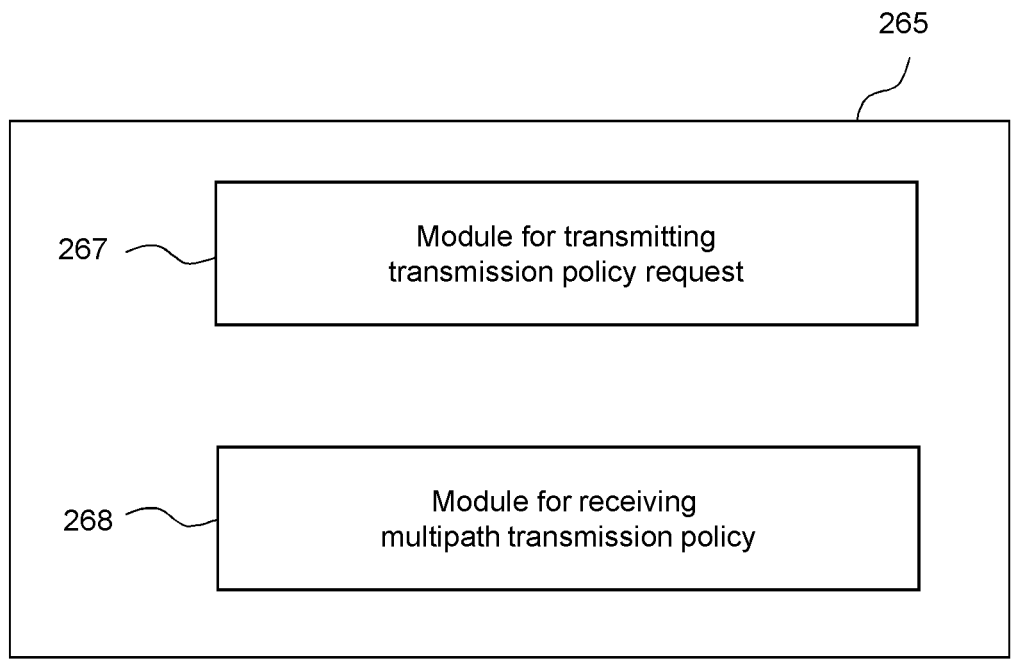
Figure 9:
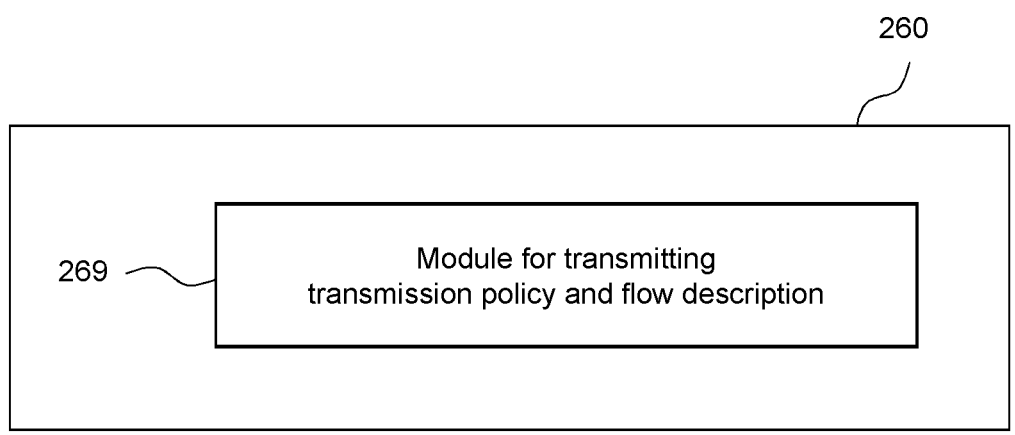
Figure 11:
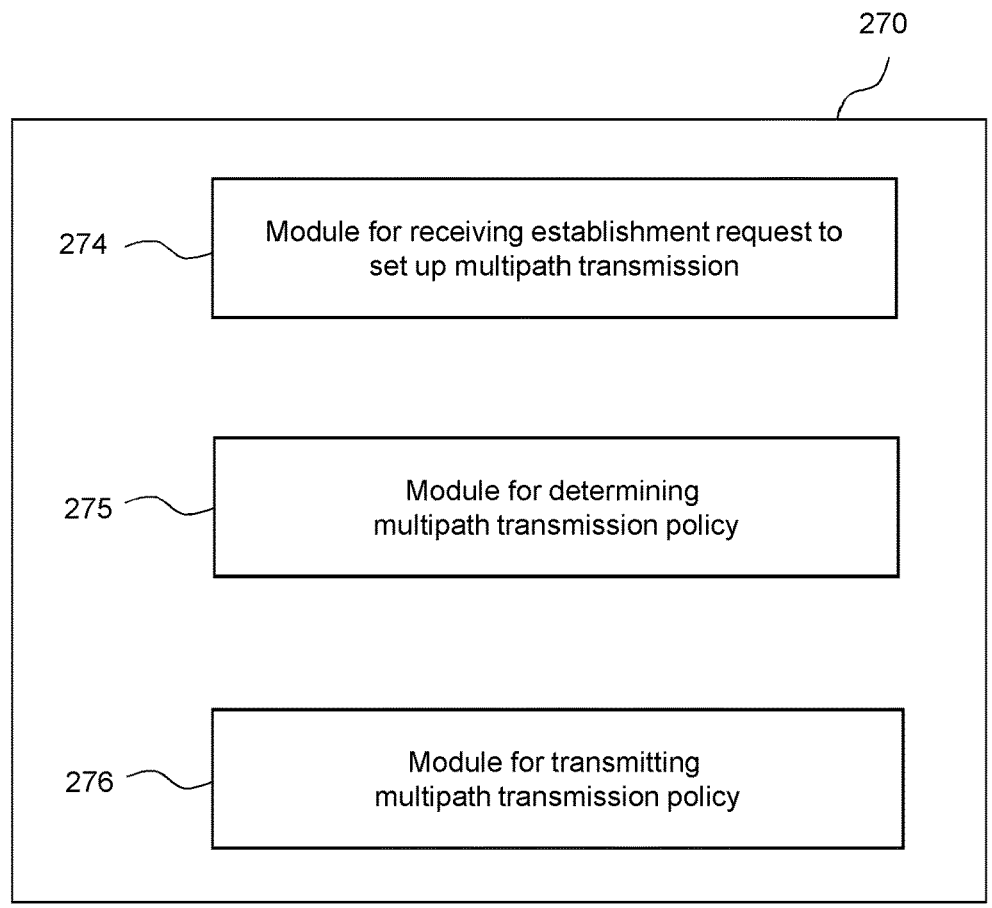
FIGS. 11-12 show example schematics of modules of a network exposure entity for implementing a multipath transmission in a wireless communications network.
Figure 12:
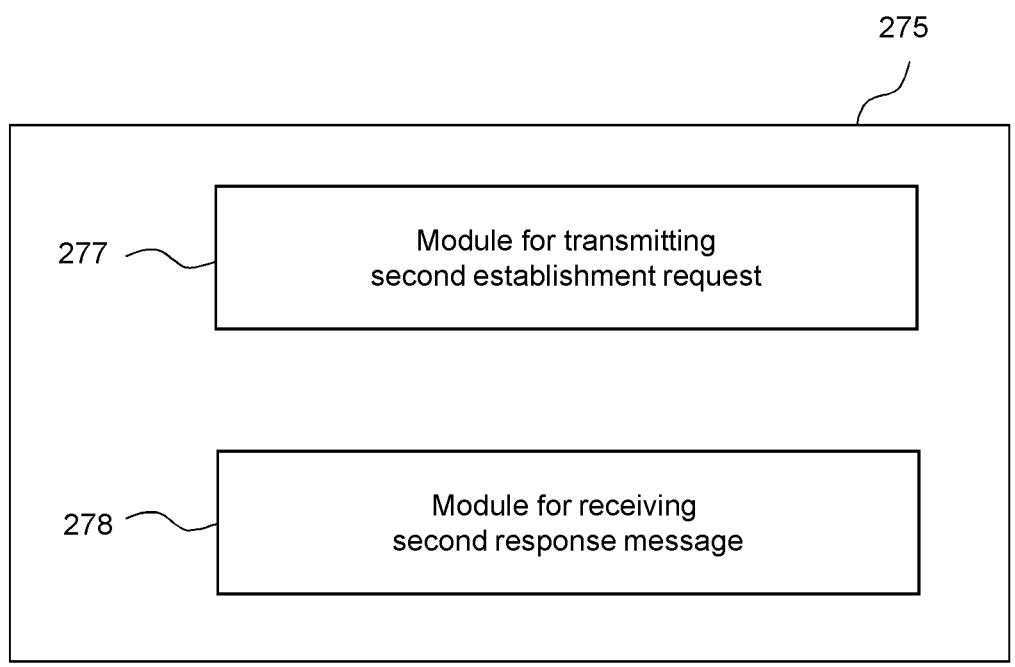
Figure 14:
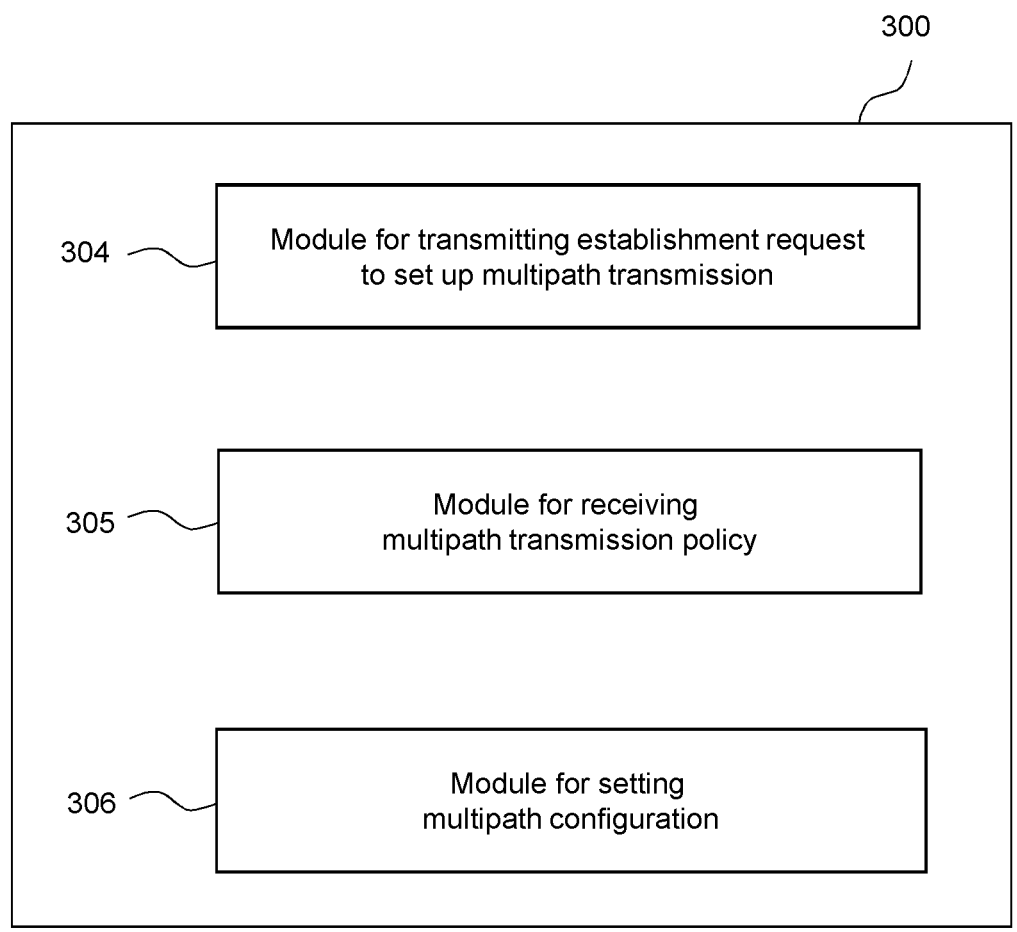
FIG. 14 shows example schematics of modules of a content provider for implementing a multipath transmission in a wireless communications network.

In particular, FIGS. 7-9 show example schematics of modules 264-269 of a policy control entity 260 for implementing a multipath transmission in wireless communications network 200. The modules 264-269 are configured to carry out the operations of steps S5, S6, S7, S8, and S11 as described above, respectively. Alternatively, or in addition, the modules 264-266 are configured to carry out the operations of steps S31, S32, and S33 as described above, respectively. Similarly, FIGS. 11-12 show example schematics of modules 274-278 of a network exposure entity 270 for implementing a multipath transmission in wireless communications network 200. The modules 274-278 are configured to carry out the operations of steps S4, S5, S8, and S9 as described above, respectively. Alternatively, or in addition, the modules 274-276 are configured to carry out the operations of steps S41, S42, and S43 as described above, respectively. Similarly, FIG. 14 shows example schematics of modules 304-306 of a content provider 300 for implementing a multipath transmission in wireless communications network 200. The modules 304-306 are configured to carry out the operations of steps S4, S9, and S10 as described above, respectively. Alternatively, or in addition, the modules 304-306 are configured to carry out the operations of steps S51, S52, and S53 as described above, respectively.

From the above said some general conclusions can be drawn: in general, the invention allows the network operator to be informed about the existence of a multipath transmission between a user equipment 100 and a content provider 300. Thanks to this it is advantageously possible for the network operator to correctly recognize the multipath data flow and act on it accordingly. Moreover, the network operator can provide input on the configuration of the multipath transmission. Thanks to this it is advantageously possible for the multipath transmission to be set up in a manner which takes into account relevant information provided by the network operator.

In some aspects, it is possible for the step S6, S7 of determining to comprise a step S6 of transmitting, in response to the establishment request, a transmission policy request, to a data repository, and a step S7 of receiving a corresponding multipath transmission policy from the data repository. Similarly, in some aspect, the second module 265 of the policy control entity can further comprise a fourth module 267 for transmitting, in response to the establishment request, a transmission policy request, to a data repository, and a fifth module 268 for receiving a corresponding multipath transmission policy from the data repository.

Moreover, in some aspects, it is possible for the method for operating the policy control entity 260 to further comprise a step S11 of transmitting, to each session control entity configured to respectively control the first data packet session and the second data packet session, a corresponding transmission policy with a corresponding flow description. Similarly, in some aspect, the policy control entity 260 can further comprise a sixth module 269 for transmitting, to each session control entity configured to respectively control the first data packet session and the second data packet session, a corresponding transmission policy with a corresponding flow description.

In some aspects, it is possible for the step S5, S8 of determining to comprise a step S5 of transmitting, in response to the establishment request, a second establishment request, to a policy control entity, and a step S8 of receiving a corresponding second response message from the policy control entity. Similarly, in some aspects, the second module 275 of the network exposure entity 270 can further comprise a fourth module 277 for transmitting, in response to the establishment request, a second establishment request, to a policy control entity, and a fifth module 278 for receiving a corresponding second response message from the policy control entity.

According to another aspect, in any of the aspects above, the flow description can comprise at least an address of the content provider, and one or more addresses of the user equipment. According to another aspect, in any of the aspects above, the flow description can comprise at least a first flow description, for the first data packet session, and a second flow description, for the second data packet session. The first flow description can comprise at least an address of the content provider, and an address of the user equipment over the cellular access node. The second flow description can comprise at least an address of the content provider, and an address of the user equipment over the non-cellular access node. According to yet another aspect, in any of the aspects above, the flow description can comprises at least a first flow description, for the first data packet session, and a second flow description, for the second data packet session. The first flow description can comprises a 5-tuple descriptive of the first data packet session. The second flow description can comprise a 5-tuple descriptive of the second data packet session.

The invention claimed is:

1. A method for operating a policy control entity in a wireless communications network, in which a multipath transmission with at least two data packet sessions can be provided between a content provider and a user equipment, and wherein a first data packet session of the at least two data packet sessions is transmitted through the wireless communications network over a cellular access node and a second data packet sessions of the at least two data packet sessions is transmitted through the wireless communications network over a non-cellular access node, the method comprising:
   receiving an establishment request from a network exposure entity to set up the multipath transmission, the establishment request comprising multipath information including a multipath indicator, indicating that the multipath transmission is requested, and a flow description for the first data packet session and the second data packet session;
   determining, for at least the first data packet session and the second data packet session, a multipath transmission policy, the determining including:
      transmitting, in response to the establishment request, a transmission policy request, to a data repository; and
      receiving a corresponding multipath transmission policy from the data repository; and
   transmitting, in response to the establishment request, a response message to the network exposure entity including the multipath transmission policy.

2. The method of claim 1, further comprising transmitting, to each session control entity configured to respectively control the first data packet session and the second data packet session, a corresponding transmission policy with a corresponding flow description.

3. The method of claim 1, wherein the flow description comprises at least:
   an address of the content provider; and
   one or more addresses of the user equipment.

4. The method of claim 1, wherein the flow description comprises at least a first flow description for the first data packet session, and a second flow description for the second data packet session, and wherein:
   the first flow description comprises at least:
      an address of the content provider; and
      an address of the user equipment over the cellular access node; and
   the second flow description comprises at least:
      an address of the content provider; and
      an address of the user equipment over the non-cellular access node.

5. The method of claim 1, wherein the flow description comprises at least a first flow description for the first data packet session, and a second flow description for the second data packet session, and wherein:
   the first flow description comprises a 5-tuple descriptive of the first data packet session; and
   the second flow description comprises a 5-tuple descriptive of the second data packet session.

6. A method for operating a network exposure entity in a wireless communications network, in which a multipath transmission with at least two data packet sessions can be provided between a content provider and a user equipment, and wherein a first data packet session of the at least two data packet sessions is transmitted through the wireless communications network over a cellular access node and a second data packet sessions of the at least two data packet sessions is transmitted through the wireless communications network over a non-cellular access node, the method comprising:
   receiving an establishment request from the content provider to set up the multipath transmission, the establishment request comprising multipath information including a multipath indicator, indicating that the multipath transmission is requested, and a flow description for the first data packet session and the second data packet session;
   determining, for at least the first data packet session and the second data packet session, a multipath transmission policy, the determining including:
      transmitting, in response to the establishment request, a second establishment request, to a policy control entity; and
      receiving a corresponding second response message from the policy control entity; and
   transmitting, in response to the establishment request, a response message to the content provider including the multipath transmission policy.

7. The method of claim 6, wherein the flow description comprises at least:
   an address of the content provider; and
   one or more addresses of the user equipment.

8. The method of claim 6, wherein the flow description comprises at least a first flow description for the first data packet session, and a second flow description for the second data packet session, and wherein:
   the first flow description comprises at least:
      an address of the content provider; and
      an address of the user equipment over the cellular access node; and
   the second flow description comprises at least:

an address of the content provider; and
an address of the user equipment over the non-cellular access node.

9. The method of claim 6, wherein the flow description comprises at least a first flow description for the first data packet session, and a second flow description for the second data packet session, and wherein:
the first flow description comprises a 5-tuple descriptive of the first data packet session; and
the second flow description comprises a 5-tuple descriptive of the second data packet session.

10. A method for operating a content provider, the content provider being configured for sending data over a wireless communications network, in which a multipath transmission with at least two data packet sessions can be provided between the content provider and a user equipment, and wherein a first data packet session of the at least two data packet sessions is transmitted through the wireless communications network over a cellular access node and a second data packet sessions of the at least two data packet sessions is transmitted through the wireless communications network over a non-cellular access node, the method comprising:
transmitting an establishment request to a network exposure entity to set up the multipath transmission, the establishment request comprising multipath information including a multipath indicator, indicating that the multipath transmission is requested, and a flow description for the first data packet session and the second data packet session, the flow description including at least:
an address of the content provider; and
one or more addresses of the user equipment;
receiving, in response to the establishment request, a response message from the network exposure entity including a multipath transmission policy; and
setting a multipath configuration of the content provider with respect to the user equipment based on the multipath transmission policy.

11. The method of claim 10, wherein the flow description comprises at least a first flow description for the first data packet session, and a second flow description for the second data packet session, and wherein:
the first flow description comprises at least:
an address of the content provider; and
an address of the user equipment over the cellular access node; and
the second flow description comprises at least:
an address of the content provider; and
an address of the user equipment over the non-cellular access node.

12. The method of claim 10, wherein the flow description comprises at least a first flow description for the first data packet session, and a second flow description for the second data packet session, and wherein:
the first flow description comprises a 5-tuple descriptive of the first data packet session; and
the second flow description comprises a 5-tuple descriptive of the second data packet session.

13. A policy control entity for a wireless communications network, in which a multipath transmission with at least two data packet sessions can be provided between a content provider and a user equipment, and wherein a first data packet session of the at least two data packet sessions is transmitted through the wireless communications network over a cellular access node and a second data packet sessions of the at least two data packet sessions is transmitted through the wireless communications network over a non-cellular access node, the policy control entity comprising:
memory configured to store instructions; and
processing circuitry operatively connected to the memory and configured to execute the instructions to cause the policy control entity to:
receive an establishment request from a network exposure entity to set up the multipath transmission, the establishment request comprising multipath information including a multipath indicator, indicating that the multipath transmission is requested, and a flow description for the first data packet session and the second data packet session;
determine, for at least the first data packet session and the second data packet session, a multipath transmission policy, to determine the multipath transmission policy, the processing circuitry is configured to execute the instructions to cause the policy control entity to:
transmit, in response to the establishment request, a transmission policy request, to a data repository; and
receive a corresponding multipath transmission policy from the data repository; and
transmit, in response to the establishment request, a response message to the network exposure entity including the multipath transmission policy.

14. The policy control entity of claim 13, wherein the processing circuitry is further configured to execute the instructions to cause the policy control entity to transmit, to each session control entity configured to respectively control the first data packet session and the second data packet session, a corresponding transmission policy with a corresponding flow description.

15. A network exposure entity for a wireless communications network, in which a multipath transmission with at least two data packet sessions can be provided between a content provider and a user equipment, and wherein a first data packet session of the at least two data packet sessions is transmitted through the wireless communications network over a cellular access node and a second data packet sessions of the at least two data packet sessions is transmitted through the wireless communications network over a non-cellular access node, the network exposure entity comprising:
memory configured to store instructions; and
processing circuitry operatively connected to the memory and configured to execute the instructions to cause the network exposure entity to:
receive an establishment request from the content provider to set up the multipath transmission, the establishment request comprising multipath information including a multipath indicator, indicating that the multipath transmission is requested, and a flow description for the first data packet session and the second data packet session;
determine, for at least the first data packet session and the second data packet session, a multipath transmission policy, to determine the multipath transmission policy, the processing circuitry is configured to execute the instructions to cause the network exposure entity to:
transmit, in response to the establishment request, a second establishment request, to a policy control entity; and
receive a corresponding second response message from the policy control entity; and
transmit, in response to the establishment request, a response message to the content provider including the multipath transmission policy.

16. A content provider, the content provider being configured for sending data over a wireless communications network, in which a multipath transmission with at least two data packet sessions can be provided between the content provider and a user equipment, and wherein a first data packet session of the at least two data packet sessions is transmitted through the wireless communications network over a cellular access node and a second data packet sessions of the at least two data packet sessions is transmitted through the wireless communications network over a non-cellular access node, the content provider comprising:

memory configured to store instructions; and processing circuitry operatively connected to the memory and configured to execute the instructions to cause the content provider to:

transmit an establishment request to a network exposure entity to set up the multipath transmission, the establishment request comprising multipath information including a multipath indicator, indicating that the multipath transmission is requested, and a flow description for the first data packet session and the second data packet session, the flow description including at least:

an address of the content provider; and one or more addresses of the user equipment;

receive, in response to the establishment request, a response message from the network exposure entity including a multipath transmission policy; and set a multipath configuration of the content provider with respect to the user equipment based on the multipath transmission policy.

\* \* \* \* \*